US012632307B2

(12) United States Patent
George

(10) Patent No.: US 12,632,307 B2
(45) Date of Patent: *May 19, 2026

(54) BACKGROUND JOB PROCESSING FRAMEWORK

(71) Applicant: Nasdaq, Inc., New York, NY (US)

(72) Inventor: Santhosh Philip George, Bangalore (IN)

(73) Assignee: NASDAQ, INC., New York, NY (US)

( * ) Notice: Subject to any disclaimer, the term of this patent is extended or adjusted under 35 U.S.C. 154(b) by 735 days.

This patent is subject to a terminal disclaimer.

(21) Appl. No.: 17/897,501

(22) Filed: Aug. 29, 2022

(65) Prior Publication Data

US 2022/0413927 A1     Dec. 29, 2022

Related U.S. Application Data

(63) Continuation of application No. 16/702,155, filed on Dec. 3, 2019, now Pat. No. 11,429,448, which is a
(Continued)

(30) Foreign Application Priority Data

Jul. 30, 2015     (IN) ........................... 2344/DEL/2015

(51) Int. Cl.
*G06F 9/50* (2006.01)
*G06F 9/48* (2006.01)
*G06F 16/25* (2019.01)

(52) U.S. Cl.
CPC .......... *G06F 9/5038* (2013.01); *G06F 9/4881* (2013.01); *G06F 16/252* (2019.01)

(58) Field of Classification Search
CPC ..... G06F 9/5038; G06F 16/252; G06F 9/4881
See application file for complete search history.

(56) References Cited

U.S. PATENT DOCUMENTS

| | | | |
|---|---|---|---|
| 5,402,350 A | 3/1995 | Kline | |
| 5,511,197 A | 4/1996 | Hill | |
| | (Continued) | | |

FOREIGN PATENT DOCUMENTS

| | | | |
|---|---|---|---|
| CN | 101166208 A | 4/2008 | |
| CN | 101957780 A | 1/2011 | |
| | (Continued) | | |

OTHER PUBLICATIONS

Notification of Transmittal of the International Search Report and The Written Opinion of the International Searching Authority in related PCT Appln. No. PCT/US16/44383.
(Continued)

*Primary Examiner* — Lewis A Bullock, Jr.
*Assistant Examiner* — Carlos Alberto Espana
(74) *Attorney, Agent, or Firm* — Nixon & Vanderhye, PC

(57)     ABSTRACT

The described technology relates to scheduling jobs of a plurality of types in an enterprise web application. A processing system configures a job database having a plurality of job entries, and concurrently executes a plurality of job schedulers independently of each other. Each job scheduler is configured to schedule for execution jobs in the jobs database that are of a type different from types of jobs others of the plurality of job schedulers are configured to schedule. The processing system also causes performance of jobs scheduled for execution by any of the plurality of schedulers. Method and computer readable medium embodiments are also provided.

19 Claims, 13 Drawing Sheets

Related U.S. Application Data continuation of application No. 15/834,891, filed on Dec. 7, 2017, now Pat. No. 10,528,394, which is a continuation of application No. 15/220,511, filed on Jul. 27, 2016, now Pat. No. 9,870,266.

(56) References Cited

U.S. PATENT DOCUMENTS

| | | | |
|---|---|---|---|
| 5,964,892 A | 10/1999 | Tang | |
| 6,029,174 A | 2/2000 | Sprenger | |
| 6,263,358 B1 | 7/2001 | Lee | |
| 6,477,591 B1 | 11/2002 | VanderSpek | |
| 7,386,586 B1 | 6/2008 | Headley | |
| 8,185,620 B1 | 5/2012 | Boone | |
| 8,533,696 B1 | 9/2013 | Chalmer | |
| 9,229,774 B1 | 1/2016 | Wilkes | |
| 9,442,760 B2 * | 9/2016 | Boutin | G06F 9/4881 |
| 10,528,394 B2 * | 1/2020 | George | G06F 9/5038 |
| 10,853,365 B2 * | 12/2020 | Idei | G06F 16/24542 |
| 2002/0078207 A1 | 6/2002 | Iwamoto | |
| 2002/0188655 A1 | 12/2002 | Brown | |
| 2003/0163507 A1 | 8/2003 | Chang | |
| 2004/0073552 A1 | 4/2004 | Bailey | |
| 2005/0117584 A1 | 6/2005 | Kim | |
| 2006/0149729 A1 | 7/2006 | Pfeiffer | |
| 2007/0074150 A1 | 3/2007 | Jalfaei | |
| 2007/0266390 A1 | 11/2007 | Emmerich | |
| 2008/0021984 A1 | 1/2008 | Zarenin | |
| 2009/0089785 A1 * | 4/2009 | Marwinski | G06F 9/4843 718/102 |
| 2009/0276781 A1 * | 11/2009 | Chan | G06F 9/4881 718/103 |
| 2010/0168912 A1 | 7/2010 | Lee | |
| 2010/0299438 A1 | 11/2010 | Zimmerman | |
| 2011/0225583 A1 | 9/2011 | Suh | |
| 2011/0289503 A1 | 11/2011 | Toub | |
| 2012/0030672 A1 | 2/2012 | Zygmuntowicz | |
| 2012/0140633 A1 | 6/2012 | Stanwood | |
| 2012/0151489 A1 | 6/2012 | Wu et al. | |
| 2012/0254484 A1 * | 10/2012 | Yang | G06F 9/545 710/47 |
| 2012/0260118 A1 | 10/2012 | Jiang et al. | |
| 2013/0070592 A1 | 3/2013 | Chen | |
| 2013/0179881 A1 | 7/2013 | Calder et al. | |
| 2013/0263127 A1 | 10/2013 | Y Arcas | |
| 2013/0290976 A1 | 10/2013 | Cherkasova | |
| 2013/0339485 A1 | 12/2013 | Sen | |
| 2014/0033213 A1 | 1/2014 | Hudson | |
| 2014/0137128 A1 | 5/2014 | Chang | |
| 2014/0237476 A1 | 8/2014 | Steffen et al. | |
| 2014/0250287 A1 | 9/2014 | Akimoto | |
| 2014/0325523 A1 | 10/2014 | Picinich et al. | |
| 2015/0067175 A1 | 3/2015 | Asaduzzaman | |
| 2015/0095838 A1 | 4/2015 | Rossi | |
| 2015/0135183 A1 * | 5/2015 | Kipp | G06F 9/5038 718/103 |
| 2015/0347189 A1 | 12/2015 | Steffen | |
| 2016/0092108 A1 * | 3/2016 | Karaje | G06F 3/067 718/103 |
| 2016/0286591 A1 | 9/2016 | Yasaki | |
| 2016/0328488 A1 | 11/2016 | Lytle | |
| 2017/0031723 A1 * | 2/2017 | George | G06F 16/252 |
| 2018/0095801 A1 * | 4/2018 | George | G06F 16/252 |
| 2018/0373556 A1 | 12/2018 | Tian | |

FOREIGN PATENT DOCUMENTS

| | | | |
|---|---|---|---|
| CN | 102387173 A | 3/2012 | |
| CN | 104462302 A | 3/2015 | |

OTHER PUBLICATIONS

International Preliminary Report in corresponding PCT/US16/44383 mailed Aug. 4, 2017.

Office Action issued in corresponding Chinese Patent Application No. 201680056872.7 dated Dec. 18, 2018.

Extended European Search Report in corresponding European Application No. 16 83 1329 mailed Jan. 22, 2019.

"Thread Pool"—Wikipedia, p. 1 of 3, Jan. 22, 2019; https://en.wikipedia.org/w/index.php?title=Thread_pool&oldid=671365384.

Chinese National Intellectual Property Administration, Third Office Action dated Oct. 29, 2021, 29 pages (with English Translation).

* cited by examiner

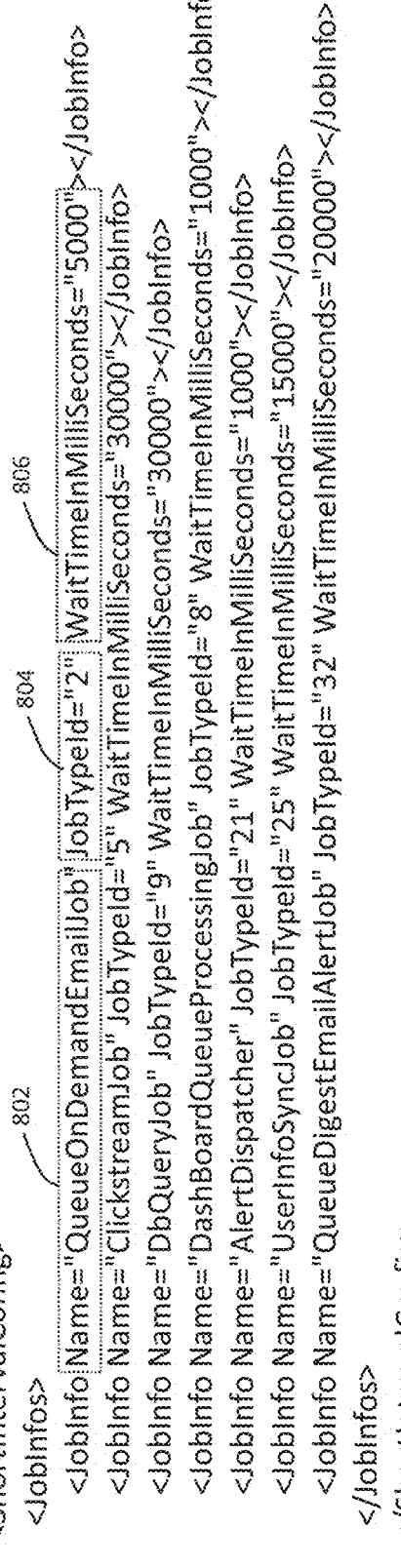

800

```
<ShortIntervalConfig>
  <JobInfos>
    <JobInfo Name="QueueOnDemandEmailJob" JobTypeId="2" WaitTimeInMilliSeconds="5000"></JobInfo>
    <JobInfo Name="ClickstreamJob" JobTypeId="5" WaitTimeInMilliSeconds="30000"></JobInfo>
    <JobInfo Name="DbQueryJob" JobTypeId="9" WaitTimeInMilliSeconds="30000"></JobInfo>
    <JobInfo Name="DashBoardQueueProcessingJob" JobTypeId="8" WaitTimeInMilliSeconds="100"></JobInfo>
    <JobInfo Name="AlertDispatcher" JobTypeId="21" WaitTimeInMilliSeconds="100"></JobInfo>
    <JobInfo Name="UserInfoSyncJob" JobTypeId="25" WaitTimeInMilliSeconds="15000"></JobInfo>
    <JobInfo Name="QueueDigestEmailAlertJob" JobTypeId="32" WaitTimeInMilliSeconds="20000"></JobInfo>
  </JobInfos>
</ShortIntervalConfig>
```

1000 start

Timer Fires
1002

Update Next Execution Times
1004

Jobs with Next
Execution Times <=0?
1006

Spawn Thread(s) to Handle
Jobs          1008

Reset Next Execution Times
1010

End

900 start

Determine Timer Intervals
902

Set Timer
904

End

1100

```
<!-- ********************* Dashboard Cleanup Job Section ************************* -->
<job>
    <name>CleanupDashboardJob</name>
    <group>CleanupDashboardJobs</group>
    <description>Cleanup dashboard stream and peeractivity data.</description>
    <job-type>
Nasdaq.Corporate.Portal.Infrastructure.Jobs.Core.Agents.Scheduled.QuartzJobAdapter,
Nasdaq.Corporate.Portal.Infrastructure.Jobs.Core
    </job-type>
    <durable>true</durable>
    <recover>false</recover>
    <job-data-map>
    <entry>
        <key>CreateJobInfoObjectAtRuntime</key>
        <value>true</value>
    </entry>
    <entry>
        <key>JobTypeId</key>
        <value>40</value>
    </entry>
    <entry>
        <key>IsBatch</key>
        <value>false</value>
    </entry>
    </job-data-map>
</job>
<trigger>
    <cron>
    <name>CleanupDashboardJobTrigger</name>
    <group>CleanupDashboardJobs</group>
    <description>Cleanup dashboard stream and peeractivity data.</description>
    <job-name>CleanupDashboardJob</job-name>
    <job-group>CleanupDashboardJobs</job-group>
    <!--Fire every minute starting at 4pm and ending at 4:55pm, every day-->
    <!--<cron-expression>0 0-55 06 * * ?</cron-expression>-->
    <!--Fire every day at 1am EST-->
    <cron-expression>0 0 01 * * ?</cron-expression>
    </cron>
</trigger>
<!-- ********************* End Dashboard Cleanup Job Section ********************* -->
```

| | Job Type Id | MachineName | IsEnabled |
|---|---|---|---|
| 1 | 1 | IN01LT00428 | 1 |
| 2 | 2 | IN01LT00428 | 1 |
| 3 | 3 | IN01LT00428 | 1 |
| 4 | 5 | IN01LT00428 | 1 |
| 5 | 9 | IN01LT00428 | 1 |
| 6 | 21 | IN01LT00428 | 1 |
| 7 | 25 | IN01LT00428 | 1 |
| 8 | 32 | IN01LT00428 | 1 |
| 9 | 33 | IN01LT00428 | 1 |
| 10 | 8 | IN01LT00132 | 1 |
| 11 | 1 | IN01LT00254 | 1 |
| 12 | 36 | IN01WS00398 | 0 |
| 13 | 37 | IN01LT00121 | 0 |
| 14 | 8 | IN01LT00443 | 1 |
| 15 | 39 | IN01LT00254 | 1 |
| 16 | 40 | IN01LT00443 | 1 |
| 17 | 36 | IN01LT00413 | 1 |
| 18 | 41 | IN01WS00227 | 1 |
| 19 | 1 | IN01LT00161 | 1 |
| 20 | 2 | IN01LT00161 | 1 |
| 21 | 16 | IN01LT00161 | 1 |
| 22 | 17 | IN01LT00161 | 1 |

FIG. 13

BACKGROUND JOB PROCESSING FRAMEWORK

CROSS-REFERENCE TO RELATED APPLICATIONS

This application is a continuation of U.S. patent application Ser. No. 16/702,155 filed Dec. 3, 2019, which is a continuation of U.S. patent application Ser. No. 15/834,891 filed Dec. 7, 2017 which is a continuation of U.S. patent application Ser. No. 15/220,511 filed Jul. 27, 2016 now U.S. Pat. No. 9,870,266 dated Jan. 16, 2018, which claims the benefit of priority of Indian Patent Application No. 2344/DEL/2015 filed on Jul. 30, 2015, and the entire contents of which are incorporated herein by reference.

BACKGROUND

Many enterprise software applications are designed as web-based applications ("web applications") so that they can be accessed from anywhere and/or using almost any processing device that can run a web browser. A web application comprises client-side components and server-side components that communicate with each other using protocols including the HTTP protocol. Client-side components of a web application are typically responsible for handling the user interface by presenting (e.g., displaying) information to the user through a user interface on the user's access device, receiving user input, etc. Server-side components are responsible for tasks including either itself generating or obtaining information from data sources to be presented to the user in accordance with received inputs.

Enterprise web applications typically run many different types of background jobs that are subject to various resource and time constraints. For example, an investor relations application ("IR application") designed primarily to provide services for an enterprise's investment advisors may be required to support concurrent jobs for handling user interface inputs from multiple users, receiving current investment information from external sources, downloading investment research reports, receiving estimate information regarding financial products, processing investment alerts, email, logging, etc. The typical mix of jobs vary in applications and/or in time, in many ways including the duration of jobs, the number of jobs of a particular type, the frequency of occurrence of jobs, etc. A number of scheduling frameworks exist for scheduling jobs for execution. However, with evolving applications having different types of jobs and end user needs, improved scheduling frameworks for handling various job mixes are still desired.

COPYRIGHT NOTICE

SUMMARY

According to some example embodiments, a server system comprising at least one memory, and a processing system having at least one processor is provided. The processing system configures a job database having a plurality of job entries, and concurrently executes a plurality of job schedulers independently of each other. Each job scheduler is configured to schedule for execution jobs in the jobs database that are of a type different from types of jobs others of the plurality of job schedulers are configured to schedule. The processing system also causes performance of jobs scheduled for execution by any of the plurality of schedulers.

The plurality of schedulers may include an on-demand scheduler operating to schedule jobs of a first type according to an on-demand basis, a short-interval scheduler operating to schedule jobs of a second type occurring repetitively at intervals of less than a predetermined duration, and a scheduled-job scheduler operating to schedule jobs of a third type at predetermined specific times or at intervals greater than the predetermined duration. The on-demand scheduler and the short-interval scheduler are periodically executed based upon respective timers, and cause jobs of the first type and the second type, respectively, to be performed without an additional scheduling step. Jobs of the third type are performed in accordance with a scheduling algorithm.

A job may be determined to correspond to one of the different types of jobs according to an urgency and/or a frequency with which the job is to be executed.

The on-demand job scheduler can include at least a high priority scheduler and a low priority scheduler, where the high priority scheduler is configured with job processing capabilities greater than the low priority scheduler. The on-demand job scheduler can be configured to allocate a first number of threads to the high priority job scheduler and a second number of threads, less than the first number of threads, to the low priority job scheduler.

The high priority job scheduler and the low priority job scheduler can be each respectively configured to access a job entry in the job database, add a job corresponding to the retrieved job entry to an in-memory queue, and cause servicing of jobs from the in-memory queue.

The high priority job scheduler can be configured to determine whether its current processing capacity before the retrieving and adding, and to perform the retrieving and adding only if the processing capacity is determined to be above a specified threshold. The current processing capacity may be determined based upon current occupancy of the in-memory queue associated with the high priority job scheduler.

The short-interval job scheduler can be invoked at intervals of a first duration, where the first duration is determined based upon configured execution intervals of a plurality of job configurations. The execution intervals may be specified in an XML file including the plurality of job configurations.

The scheduled task scheduler is configured to cause performing of a job at a time determined according to a scheduling algorithm.

Each job may include an object implementing an execute method, wherein a corresponding of the plurality of schedulers invoke the execute method in order to run the job.

The plurality of schedulers may be spawned by a same Windows® service. Each of the schedulers may be configured to transmit a heartbeat, where the Windows service determines a health of each of the schedulers based on the heartbeats.

Each of the schedulers is implemented as an agent having a respectively configured thread pool.

Another example embodiment provides a method which includes configuring, in a memory communicably coupled to a processing system having at least one processor, a job database having a plurality of job entries. The method also includes concurrently executing, on the processing system, a plurality of job schedulers independently of each other, each job scheduler configured to schedule for execution jobs in the jobs database that are of a type different from types of jobs others of the plurality of job schedulers are configured to schedule. Still further the method includes causing performance of jobs scheduled for execution by any of the plurality of schedulers.

Another example embodiment provides a non-transitory computer readable storage medium having stored thereon instructions which, when executed by a processing system having at least one processor, causes the processing system to perform operations. The operations include configuring, in a memory communicably coupled to the processing system, a job database having a plurality of job entries. The operations also include concurrently executing a plurality of job schedulers independently of each other, each job scheduler configured to schedule for execution jobs in the jobs database that are of a type different from types of jobs others of the plurality of job schedulers are configured to schedule. Still further the operations include causing performance of jobs scheduled for execution by any of the plurality of schedulers.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 8 illustrates an example XML configuration file for use by a short-interval job scheduler, according to some embodiments;

FIG. 11 illustrates a portion of an example XML configuration file for a scheduled agent, according to some embodiments;

FIG. 13 shows an example table of job type to machine mapping, according to some embodiments.

DETAILED DESCRIPTION

The embodiments described herein relate to scheduling jobs of a plurality of types in an enterprise web application. In some example embodiments, a plurality of schedulers, each scheduler programmed to schedule a type of job different from the other schedulers, are started. By each concurrent scheduler operating, independently from the other schedulers, to improve (e.g., optimally perform) scheduling of background jobs having certain common timing requirements and/or other common characteristics, the entire mix of jobs can be more efficiently scheduled for execution (e.g., to be run by a processor) while satisfying the time constraints of each type of job. This may achieve significant efficiency gains over conventional scheduling techniques where, in an application, many types of jobs were being handled by a single type of scheduler.

The embodiments described herein may be used to improve the overall performance of an enterprise web application such as, but without limitation, the example IR application noted above. As noted above, the IR application may have many types of concurrently executing jobs at any particular time. For example, on a server system running the web application, numerous background jobs may be started to handle communications with the many client-side user interfaces. Other jobs may include obtaining, processing and delivering financial information, database queries, research reports, estimates, news, alerts etc., from external services; email sending and receiving; file sending and downloading; logging; and system maintenance etc.

Figure 1:
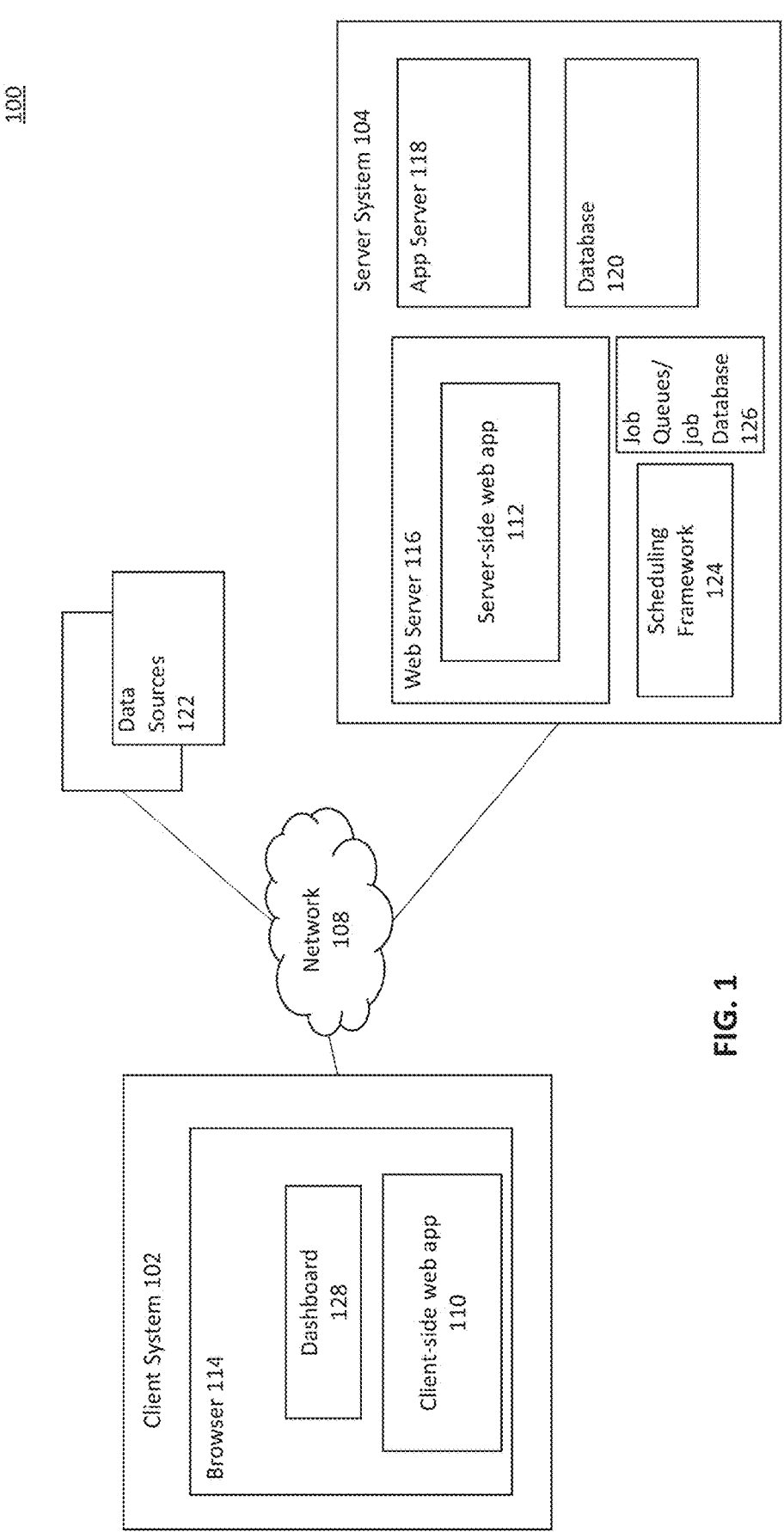
FIG. 1 illustrates an example computing environment in which an enterprise web application such as the example IR application can be run in accordance with some embodiments.

FIG. 1 illustrates an example computing environment 100 in which an enterprise web application such as the example IR application can be run in accordance with some embodiments. In computing environment 100, client system 102 and a server system 104 communicate with each other over a network 108 to enable the use of a web application, such as, for example, the IR application. It should be appreciated that the network 108 can comprise a network of interconnected computing devices, such as the Internet. The network 108 can also comprise a local area network (LAN) and/or include a peer-to-peer connection between the client system 102 and the server system 104.

The web application includes a client-side web application component ("client-side application") 110 that is executed on the client system 102 and a server-side web application component ("server-side application") 112 that is executed on the server system 104. The client-side application 110 may be executed within a user interface application 114 such as, for example, a browser 114. A dashboard 128, which operates as a user interface and/or landing page (e.g., the first page bought up when a user visits the IR application), may be a part of client-side web application 110. The dashboard 128 may, for example, provide summarized information for various aspects of the web application in respective widgets. The server-side application 112 may be executed by a web server 116 and/or application server 118 of server system 104. Web server 116 performs functionality such as implementing the HTTP protocol and communicating with the web browser 114 (described in further detail below) in the client system 110 via HTTP. Data items relating to the web application, such as, for example, configuration and/or performance data, user access, etc., may be stored in a database 120 of the server system 104. Application server 118 can, for example, execute server-side (or "backend") application services. In performing the web application, the web server 116 and/or the application server 118 may access one or more external data sources 122 over network 108 in order to obtain information. In some embodiments, the web server 116 and the application server 118 may operate as one process (or a same group of processes).

The client system 102 can include software components for performing processing related to applications defined according to the multiple single page application (SPA) or other architecture. As a non-limiting example, the client system 102 may have a web browser application 114 consisting of, at least, a rendering module, a networking module and a JavaScript® module (not shown separately). The rendering module can implement functionality for the graphical display and rendering of web pages. It can, for example, generate graphical data that corresponds to the HTML and/or DOM that defines a web page processed by the web browser 114. This graphical data can, potentially after further modification/transformation by the operating system of the client system 102, be displayed on a display of the client system 102. Alternatively or additionally, whenever it is described in this document that the client system 102 renders/displays a web page, the rendering/displaying module may perform functionality related to the rendering/display of the web page. The networking module can implement the HTTP protocol, and be used to handle various HTTP messages between the client system 102 and the web server 116 in the server system 104. Alternatively or additionally, whenever it is described in this document that the client system 102 communicates using HTTP, the networking module may handle the HTTP aspects of such communications. The JavaScript module can be used to execute JavaScript scripts, manipulate JavaScript objects, modify the DOMs of web pages loaded at the web browser application 114, and perform other functionality related to JavaScript. The JavaScript module may be, for example, a JavaScript engine, a JavaScript virtual machine, a JavaScript runtime, or any other type of software module capable of executing JavaScript instructions. Alternatively or additionally, whenever it is described in this document that the client system 102 performs functionality related to JavaScript, such functionality may be handled by the JavaScript module.

A scheduling framework 124 may be used to schedule the various jobs that handle aspects of the web application and other jobs that handle system tasks relating to the server system 104. For example, various parts of the web application may write entries into job queues and/or job database 126, from which the scheduling framework 124 according to embodiments would service those jobs.

Although one client system 102 is shown in FIG. 1, it will be understood that server system 104 may communicate with any number of client systems, such as client system 102, in order to provide services related to the web application to users of those client systems. Also, although shown as one system 104, persons of skill in the art will understand that the server system may include any number of single- and/or multi-processor computers that are communicably interconnected. In some embodiments, the server system 104 may be run in a server farm and/or cloud services environment. The components of the server system 104, such as web server 116, application server 118, database 120, server-side web application 112, scheduling framework 124 and the job queues/job database 126 may accordingly distributed over a plurality of processors and/or computers.

Figure 2:
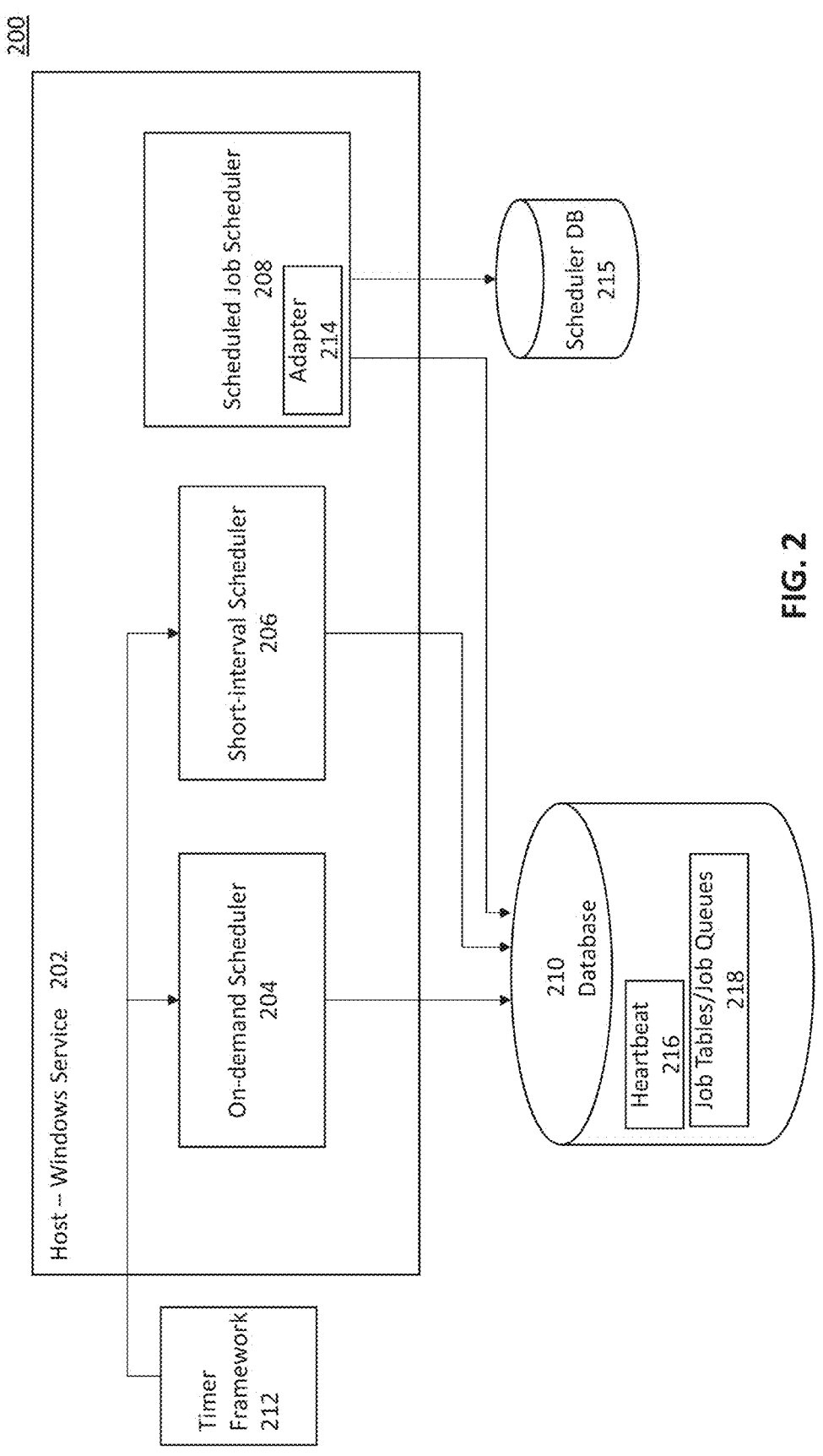
FIG. 2 schematically illustrates some aspects of the scheduling framework shown in FIG. 1, according to some embodiments.

FIG. 2 schematically illustrates some aspects of the scheduling framework 124 shown in FIG. 1, according to some embodiments. The scheduling framework 200 comprises at least three scheduling agents 204, 206 and 208, that run concurrently with each other. Each of the scheduling agents 204, 206 and 208 is configured to handle jobs of a particular type or group of types which is different from the types of jobs handled by the other scheduling agents. In some embodiments scheduling agent 204, 206 and 208 are configured to handle first, second and third job type groups (each of one or more job types) such that there is no overlap in job types between the scheduling agents. Handling a job includes, based upon an entry found in a job queue/job database (e.g., 126 in FIG. 1) for a particular job to be executed, causing the execution of that particular job by a processor. For example, one of the scheduler 204-208 may handle a job in job queue 126 by retrieving an entry for a file download job from the job queue 126, and causing the execution of a corresponding file download job on a processor. The scheduler 204-208 may cause the execution of the job by either itself starting, or causing a helper process to start, the execution of the job on a selected processor.

Scheduling agent 204 is configured to handle on-demand jobs, and will be referred to herein as the on-demand scheduling agent (or on-demand scheduler) 204. On-demand scheduler 204 is configured to handle on-demand jobs. That is, on-demand scheduler 204 is configured to handle jobs that are should be processed on an "as soon as possible" (e.g., "run now or as soon as possible") basis. Typically, in environments such as the IR application, user interface interactions require processing on an on-demand basis. For example, the web application may be driven to minimize the response time perceived by the user when interacting with the user interface (e.g., dashboard 128), and would thus require the user interface inputs are handled frequently and instantaneously or near instantaneously (e.g., with the minimum delay). Example jobs initiated by the user via the user interface may include generation of reports, and/or research reports download, jobs for pdf stitching in response to user requests, and the like.

Scheduling agent 206 is referred to herein as the short-interval scheduling agent (short-interval scheduler), and is configured to handle jobs that require to be run repetitively in relatively short intervals. For example, sending and receiving email, writing to log files (e.g., logging user interactions), downloading frequently updated information from subscribed services, updating information from external data sources displayed on the multiple widgets on dashboard 128 etc.

Scheduler agent 208 is referred to herein as the scheduled agent. The scheduled agent is configured for handling jobs that are relatively infrequently run. These may include one-time jobs that can be scheduled for a future time, and repetitive jobs that are run with a relatively large repeating interval (e.g., hours). Example scheduled tasks may include system cleanup jobs, daily backup of the web application, search (e.g., includes building an index in hourly or daily intervals based on which free-text search can be performed).

The agents 204-208 are spawned by a single process during system and/or web application startup. In an example embodiment, a Windows Services™ job, host 202, started when the web server 104 starts up the server-side web application (e.g., the server-side application processing for the example IR application) spawns the three schedulers 204-208. Host 202 may subsequently operate to stop the schedulers 204-208 upon receiving a user command and/or the web application being shut down. Having a single process spawn the agents 204-208 makes deployments and configurations easier when multiple job servers are present as is usually the case in enterprise systems, and thereby improves maintainability. Having a single process also helps to enable or disable a particular type of agent 204-208 on a machine based on need through a centralized configuration rather than conditional deployments, and gives more flexibility to adjust based on requirements.

Each of the schedulers 204-208 may regularly communicate with, or logs an entry to, a database 210 at a configurable interval. The system (or host 102) may use these communications and/or entries as a heartbeat mechanism to monitor the status of each of the schedulers. For example, if any particular scheduler fails to update a corresponding heartbeat 216 at the database 210 for a configurable interval, host 102 which monitors the database at regular intervals may determine that that particular scheduler is no longer active, and may startup an instance of the corresponding scheduler.

Database 210 may also include job entries 218. The job entries 218 represent jobs to be executed. An entry for a particular job may be in database 210 as database entries and/or in one or more job queues. For example, each job operating in the web application (e.g., web server, application server, email server, logging application) may enter into database 210 (or enqueue into job queue in database 210) entries representing jobs that are required to be run. Each entry may, for example, identify the type of job (e.g., a job type identifier) and the parameters (if any) required for performing the job (e.g., location and filename of file to be downloaded, send/receive email from queue requires no parameters, etc.).

At least some of the schedulers 204-208 are driven by timers 212. For example, the on-demand scheduling agent 204 and the short-interval scheduling agent 206, are both triggered by configured timer firing. Each of 204 and 206 executes, or causes the execution of, jobs for which it is configured when its respective timer fires. The timer firings may be considered as checkpoints in the agents 204 and 206 to see if more jobs can be processed.

Scheduler 208, however, is scheduled, in that it determines the execution time for each of its jobs in accordance with a scheduling algorithm In some example embodiments, the scheduled agent 208 relies upon an off the shelf scheduling component such as, for example, Quartz.Net®. An adapter 214 may be used for interfacing with the off the shelf scheduling component, and a separate database 215 may be used for the scheduled jobs (e.g., for keeping job entries for scheduled jobs).

Figure 3:
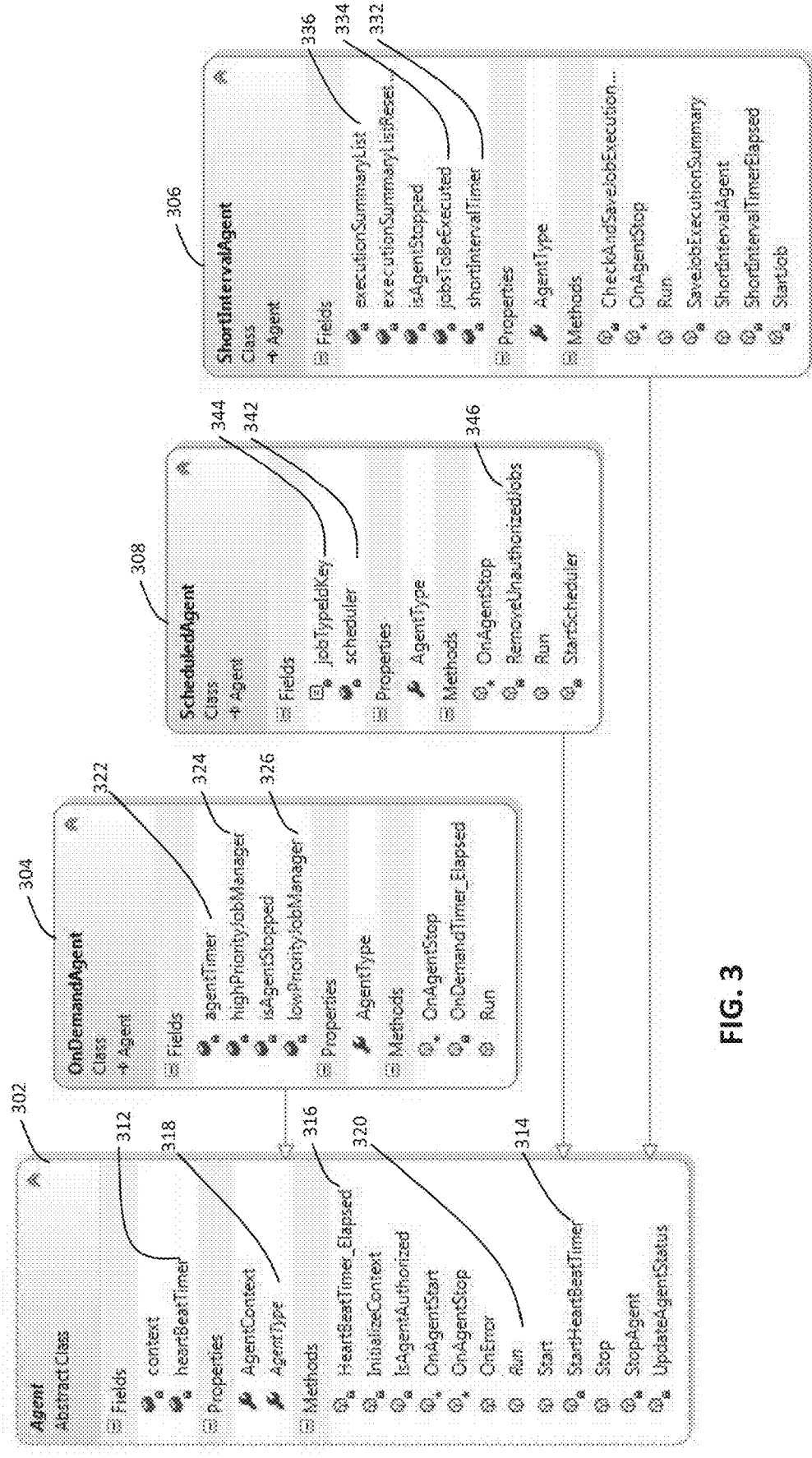
FIG. 3 illustrates an example class model that can be used in some example embodiments for the scheduling framework shown in FIG. 2.

FIG. 3 illustrates an example class model that can be used in some example embodiments for the scheduling framework 200. Each of the schedulers 204-208 are derived from an abstract agent class 302. The abstract class 302 provides for a heartbeat timer 312 and methods 314 and 316 to start the heart beat timer and to check whether the heart beat timer has expired, respectively. An agent type 318 is provided so that each of the agents 204-208 can be identified as to whether it is an on-demand, short-interval or scheduled agent. The abstract class 302 also provides a run method 320 that is implemented by each of the classes derived from the abstract class in order to run a corresponding scheduler.

The on-demand scheduling agent 204 may be created in accordance with the on-demand agent class 304 which derived from abstract class 302. On-demand agent class 304 includes a timer 322, a high priority job manager 324, and a low priority job manager 326. The separation of high priority job manager and the low priority job manager helps avoid pre-emption or starvation of certain low priority jobs even when there is an abundance of high priority jobs to be run. The operations of high priority job manager and the low priority job manager are further described below.

The short-interval scheduling agent 206 may be created in accordance with the short-interval scheduling class 306. The short-interval agent class 306 includes a timer 332, a list of jobs to be executed 334 and an execution summary 336. The agent can maintain a list of jobs executed and the amount of work done by each job in the execution summary 336. The execution summary 336 enables the execution details of jobs to be buffered by the agent and then written in a batch to database in the background. Because, short interval jobs are typically jobs that run very frequently, updating their status real time in the database would add a significant amount of network traffic and would slowdown the agent.

The timer in the short-interval agent class may be preconfigured, or may dynamically change over time. Upon determining that it is time to run a particular job type (e.g., email send/receive job) based upon the configured repetition interval, the short-interval scheduler may poll a job database and/or a email queue to determine whether there are any pending emails to be sent or received and accordingly spawn one or more tasks to handle the emails to be sent or received.

The scheduled agent 208 may be created in accordance with the scheduled agent class 308. The scheduled agent class 308 includes a scheduler 342, for using a third-party scheduler such as Quartz.net for scheduling. Scheduling may include the use of complex algorithms to determine an optimal scheduled time for each job. A job type id 344 in the configuration helps the QuartzJobAdapter to instantiate the corresponding job class. A mapping may be maintained between the job type id and the class to instantiate in a configuration. The scheduled agent may also include a method 346 to remove unauthorized jobs. For example, such removal may be based upon a list of jobs that can run (e.g., is authorized to run) on the machine is supplied from a configuration, when the agent is initialized.

Figure 4:
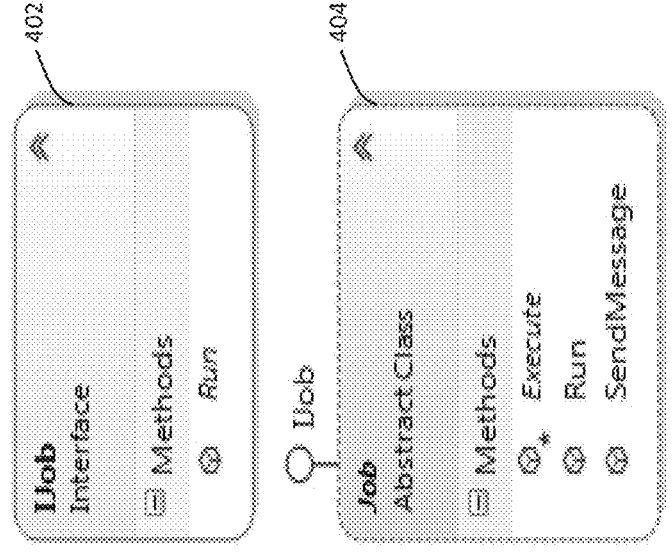
FIG. 4 illustrates an interface class and an abstract class for implementing each background job in the system, according to some embodiments.

FIG. 4 illustrates an interface class iJob 402 and an abstract class job 404 that implements the iJob 402 class. Each job that is to be run on the server system 104 is required to implement the interface iJob 402 and/or inherit from abstract class 404. Then a scheduler may run a job by calling its implemented Run method.

Figure 5:
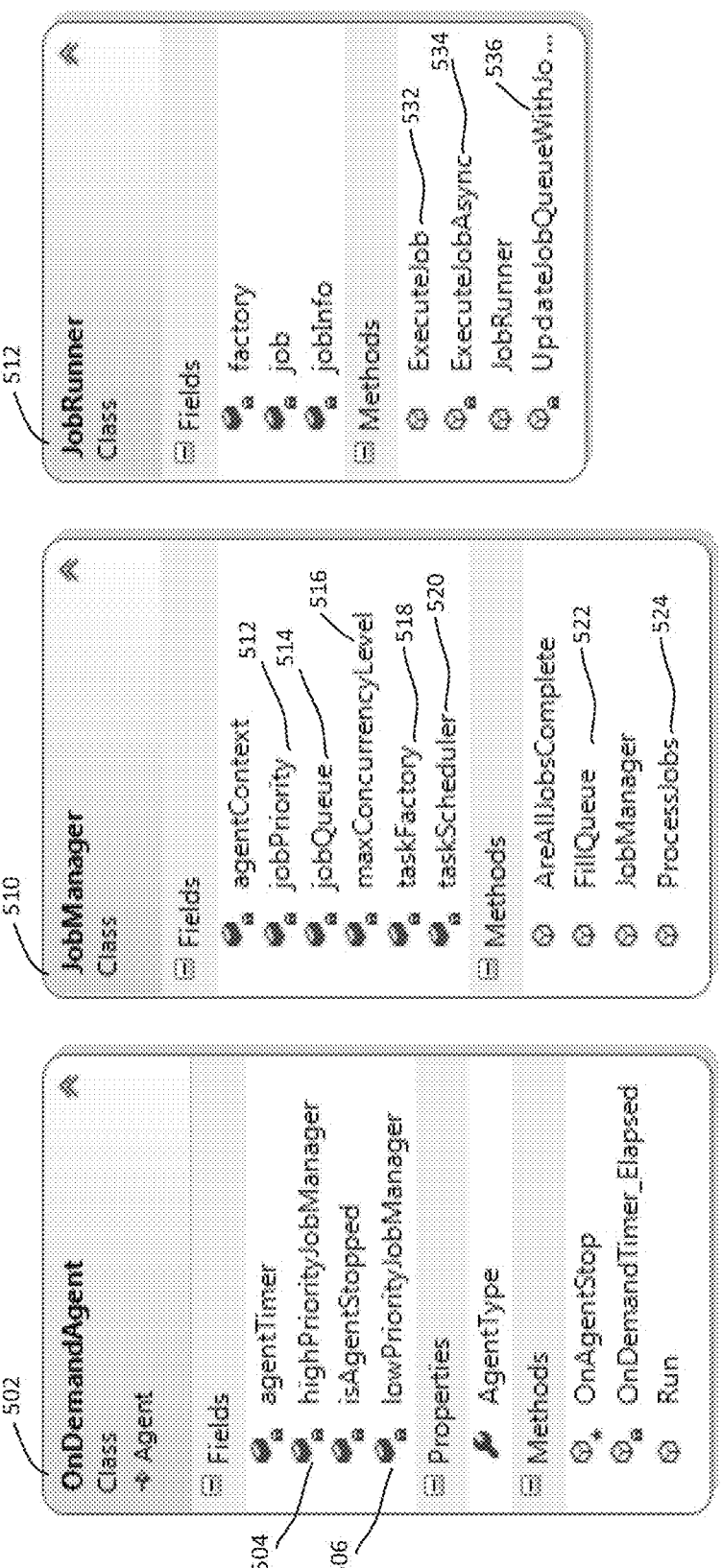
FIG. 5 illustrates a class framework for a scheduler for on-demand jobs, according to some embodiments.

FIG. 5 illustrates a class framework for the on-demand scheduler agent 204. The onDemandAgent class 502 may be used for creating the on-demand scheduler agent 204. As noted above in relation to class 304 in FIG. 3, the onDemandAgent class 502 may include two job managers—a high priority job manager 504 and a low priority job manager 506.

The high priority job manager 504 and a low priority job manager 506 may each be created using a job manager class 510. The high priority job manager and the low priority job manager perform all the job processing on behalf of the on-demand scheduler agent. By having plural priority levels within the class of on-demand jobs, embodiments enable providing improved response times for the most time critical jobs. For example, the certain user interface requests, such as display of real-time or near real-time financial information upon user demand, may be prioritized over other on-demand jobs like pdf stitching of several files and large file downloading.

Of course, in addition to or as an alternative, on-demand jobs can be prioritized according to criteria other than just the job type. For example, the pdf stitching job for a particular user or a particular class of user may be designated as a low priority on-demand job whereas the same type of job for another class of user many be designated as high priority. This provides for a great amount of scheduling flexibility that can be achieved through configuration.

The job manager class 510 field job priority 512 may be used to represent whether a manager is a high priority job manager or a low priority job manager. Each manager many also be configured with a job queue 514 to which it has access to, and from where it retrieved jobs for execution. A maximum concurrency level 516 is specified for each type of manager. The concurrency level represents the number of concurrent threads the manager is authorized (or is configured) to start. In effect, the priority can be controlled by providing the high priority job agent with a higher level of concurrency than the low priority job agent. Job manager 510 may maintain a shared task factory 518 which is passed to each job runner 512 instance. The job runner may internally use a task from the shared task factory to execute a job. This can help job manager 510 to monitor the number of tasks created and their status, and thereby control concurrency. The task scheduler 520 may be a configuration class where the maximum degree of parallelism can be configured, which is then supplied to task factory 518.

The job manager class 510 is also provided with a method 522 for filling the queue from which the manager subsequently obtains jobs for execution, and a method 524 for processing jobs.

The job manager may run each job with a separate job runner, represented by the job runner class 512. Each job manager may have a number of job runners concurrently processing jobs. The number of job runners started by a job manager may be limited to the maximum concurrency level configured for that job manager. The job runner class 512 provides a method for synchronous execution of jobs 532 where the particular job runner running a job will wait until the job is completed, and a method for asynchronous execution of jobs 534 in which the particular job runner will return before the actual job has completed. The asynchronous execution may be desirable for long running jobs such as file downloads. An updateJobQueueWithJobStatus 536 in each job runner updates back the corresponding job queue entry with the execution status—success/failure, completion time, agent, machine name, etc. This can be used by the requester of the job to check if the job completed or not. For example, the user interface component which requested for a report to be created may be informed of the completion of the creation of the report using the updateJobQueueWithJobStatus 536 in the corresponding job runner 512.

Figure 6:
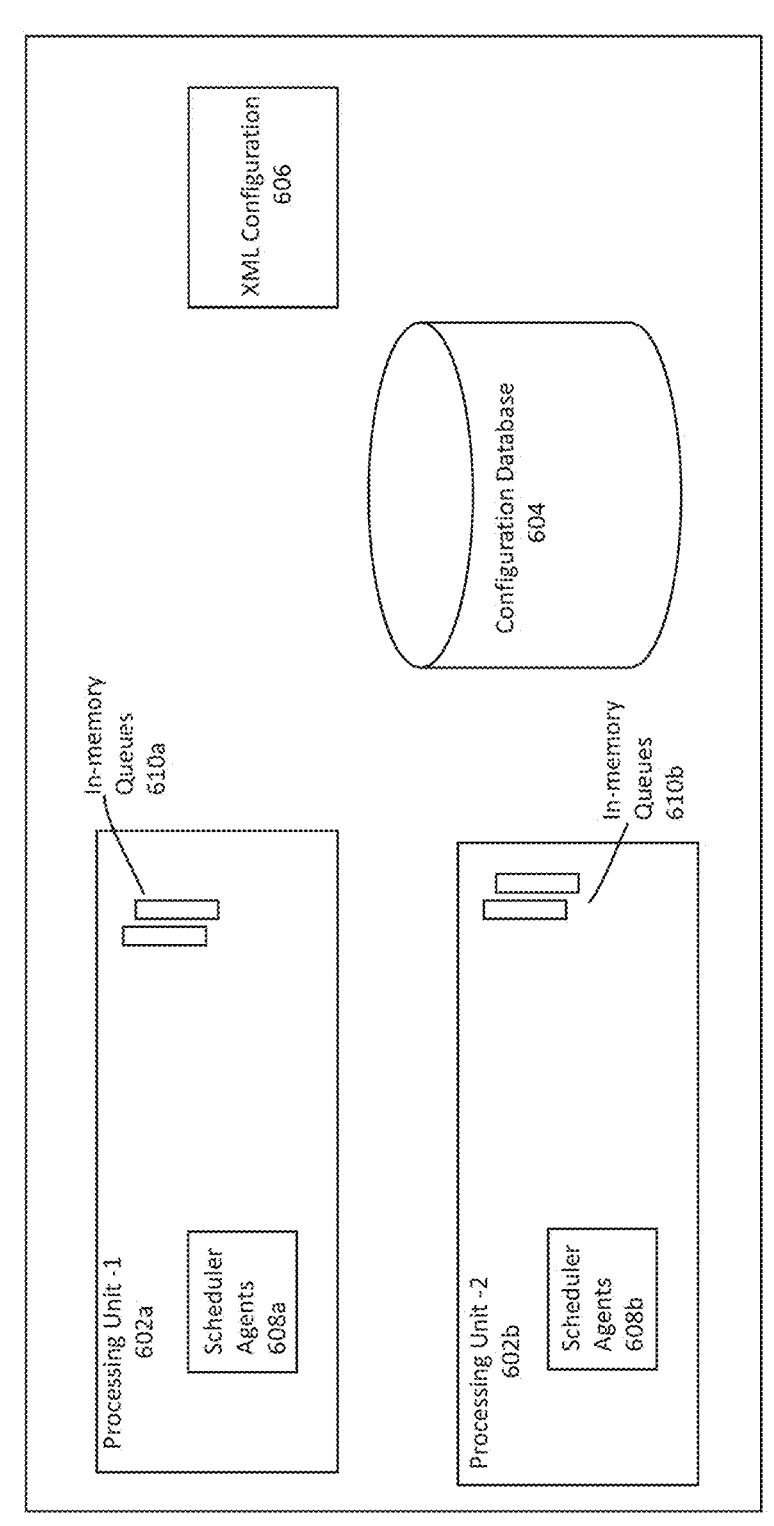
FIG. 6 is a schematic illustration of an execution environment for on-demand scheduler agents, according to some embodiments.

FIG. 6 is a schematic illustration of an execution environment 600 for the on-demand scheduler agents. The execution environment 600, which may be part of server system 104, may include one or more processing units 602 (e.g. processing units 602a and 602b) that are communicably connected. The processing units may be individual cores of the same processor, or separate processors on that same computer or physically separated computers. Each processing unit may have access to a separate memory and/or a common memory. Each processing unit 602 may have access to one or more in-memory queues 610 (e.g., in-memory queues 610a and 610b) used for on-demand jobs.

Each processing unit 602 may have running on it an on-demand scheduler agent 608 (e.g., agents 608a and 608b) and/or may have running on it one or more of high priority job managers and one or more low priority job managers for on-demand jobs.

A configuration database 604 may provide one or more job tables/queues in which jobs to be executed are written to by the various applications. The schedulers may pickup jobs to be run from these job tables/queues.

XML configurations 606 may provide configurations for job schedules etc. For example, XML configurations may specify that a job to write logs be executed every 5000 millisecond. When an appropriate scheduler determines that it is time to run the job to write logs, it determines from the database 604 the actual logging entries to be written.

In some embodiments, the database 640 is shared by all processing units 602 in the scheduling framework. The in-memory queues for on-demand jobs, on the other hand, may be in the local memory of each processing unit.

Figure 7:
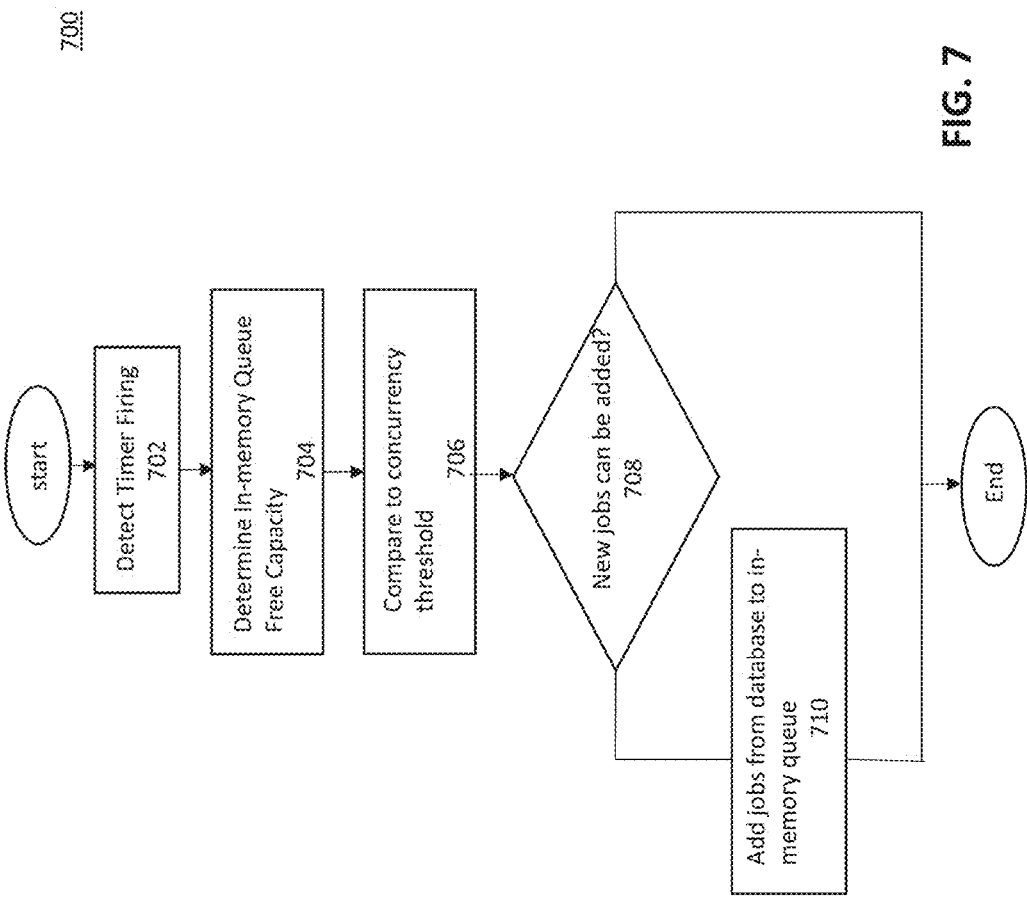
FIG. 7 illustrates a process for on-demand schedulers, according to some embodiments.

FIG. 7 illustrates a process 700 which may be used by on-demand scheduler agents for scheduling on-demand jobs according to some embodiments. For example, each of a high priority job manager and a low priority job manager may perform process 700.

Process 700 may be continually executed by a running high priority job manager or a running low priority job manager based upon a timer firing. For example, process 700 is entered by each high or low priority job manager when that job manager starts up. After entering process 700, the job manager may wait for a timer firing (e.g., a signal indicating a timer expiration). In example embodiments, an on-demand job timer is configured at 5 seconds. That is, the on-demand job timer will fire (e.g. expire) every 5 seconds until terminated.

At operation 702, a timer firing signal is received, and an iteration of processing on-demand jobs is commenced. The timer, as noted above, may be a timer shared by all on-demand job scheduling agents and/or on-demand job managers on a particular processing unit, or, in some embodiments, each on-demand scheduling agent may have its own timer.

At operation 704, an amount of free capacity in the in-memory queues used by that on-demand job manager is determined. Each job manager maintains one or more in memory queues from which it (the job manager) retrieves job to be run by a job runner. The size of the in memory queues may be configurable. There may also be a configurable re-fill threshold associated with each in-memory queue, representing a minimum portion of the in-memory queue that is occupied (i.e., populated by jobs) before the corresponding job manager refills the in-memory queue with jobs from the job database.

At operation 706 the determined in-memory queue free capacity to a concurrency threshold for the job manager. As described above, separate concurrency levels can be set for the high priority on-demand job manager and the low priority on-demand job manager. At operation 706, the amount of free in-memory queue capacity is compared to the concurrency level for the job manager.

At operation 708, based upon the comparing of the amount of free in-memory queue capacity is compared to the concurrency level, a determination is made as to whether new jobs can be added to the in-memory queue.

If the determination at 708 results in a yes, then, at operation 710, new jobs are retrieved (e.g., removed) from the database and added (e.g., written to or enqueued) to the in-memory queues. The number of jobs added may be based, at least in part, on the capacity of the in-memory queues and/or a configured maximum portion of the capacity of the queues to be used.

For example, consider a situation where the concurrency level for a high priority job manager is set at 100, indicating that the high priority on-demand job scheduler may have up to 100 concurrently running jobs. The corresponding in-memory queue may have a maximum capacity of 200, indicating that the queue can hold up to 200 jobs at a time. Also assume that at operation 704 it is determined that the free capacity corresponds to 120 jobs.

Now, after at operation 706, the comparison of the free capacity to the concurrency level is made, it may be determined at operation 708 that up to 120 new jobs may be added to the in-memory queue. With that many jobs, the entire capacity of 200 jobs of the in-memory queues may be filled. Alternatively, a configuration setting may specify that no more than 120 jobs are filled at any time by adding jobs from the database. When such a configuration of a threshold lowered from the maximum capacity is provided, only up to the configured threshold will be filled with jobs retrieved from the database. Thus, at any time, the on-demand scheduler may have some excess capacity which may be used for running jobs that the system may allow running without going through the job database, such as, for example, additional jobs created by already running jobs which require fast response times.

The above process (process 700) enables scheduler agents to cooperate across separate processing units in order to optimally schedule jobs.

FIG. 8 illustrates an example XML configuration file 800 for use by a short-interval job scheduler, such as short-interval job scheduler 206, according to some embodiments. For example, upon startup and/or at regular intervals, the short-interval job agent 206 may read the configuration file 800 from a memory.

The configuration file 800 specifies the types of jobs to be run by the short-interval scheduling agent and when such jobs should be run. Each job to be run may be specified in one line entry. For example, a line entry may include a name of the job 802, a job type 804 and the interval at which to run the job 806.

Figure 9:
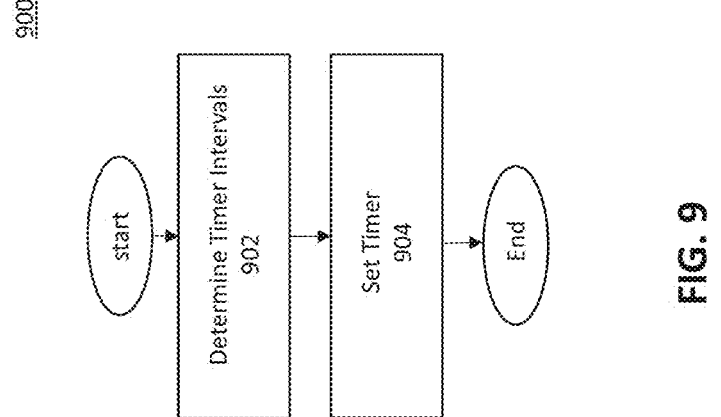
FIG. 9 illustrates a flowchart of a process performed by a short-interval scheduler to configure its timer firing interval, according to some embodiments.

FIG. 9 illustrates a flowchart of a process 900 which may be performed by a short-interval scheduler to dynamically configure its firing interval, such as, for example, short-interval scheduler 206.

Process 900 may be performed by the short-interval scheduling agent 206, upon startup and/or at predetermined regular intervals. It may also be invoked when a change is made to a configuration, such as, for example, by adding a job to the XML configuration 800.

After entering process 900, at operation 902, the minimum repetition interval from the jobs listed in the configuration may be determined. For example, considering the jobs listed in file 800 in FIG. 8 as an example, the 1000 milliseconds for dash board queue processing job and the 1000 millisecond for the alert dispatcher job may be determined as providing the minimum repetition interval.

After determining the minimum repetition time at operation 902, the short-interval job timer may be configured to the determined time at operation 904.

By causing process 900 to be run when any new job is added, or an existing job is changed, for example, in the configuration file, the short-interval job scheduler may dynamically configure its timer for changing job mixes.

Figure 10:
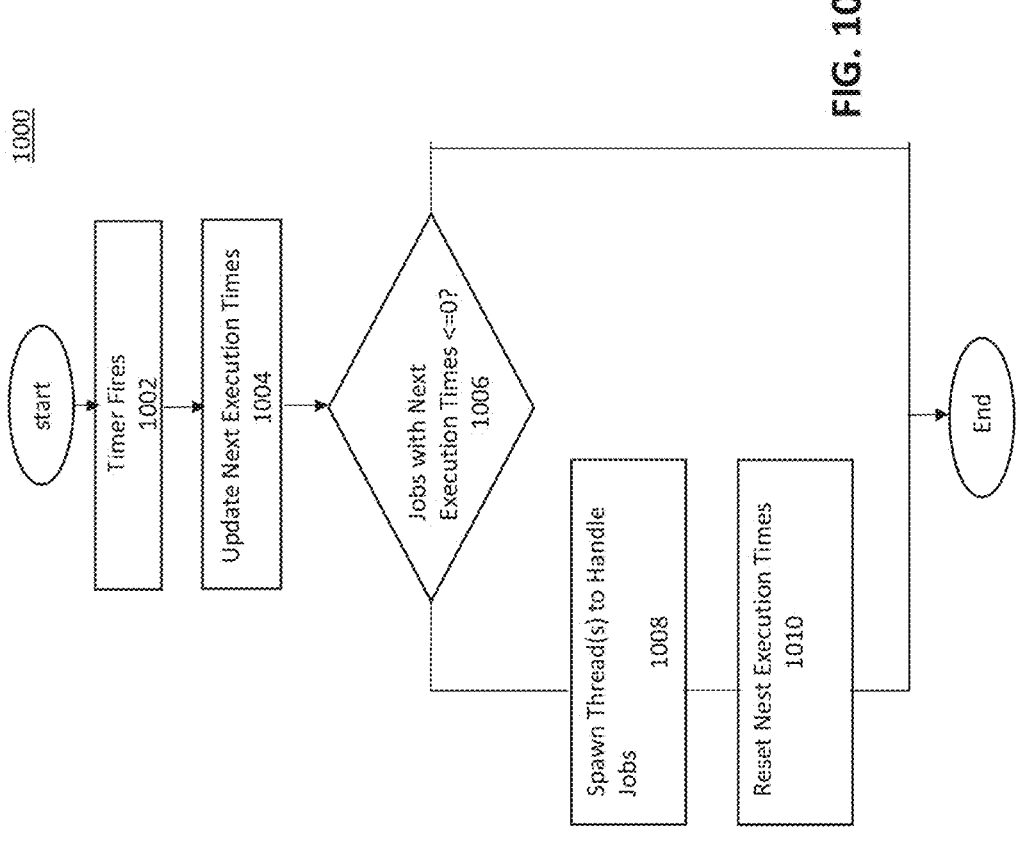
FIG. 10 illustrates a flowchart for a process for a short-interval scheduler, according to some embodiments.

FIG. 10 illustrates a flowchart for a process 1000 that a short-interval scheduler, such as short-interval scheduler 206, may perform to schedule jobs.

After entering process 1000, the short-interval scheduler may wait for a timer firing. The timer may be preconfigured and/or dynamically configured as described in relation to FIG. 9.

At operation 1002, a signal is received indicating the firing of the timer. Upon detecting the firing of the timer (e.g. by receiving the corresponding signal), process 1000 enters into the rest of the process.

At operation 1004, the next execution times are updated. For example, the short-interval scheduler agent may maintain a list of jobs in memory. The list may include an entry for each active short-interval job type, and its next execution time. At operation 1004, the next execution time for each entry may be decremented by the duration of the current short-interval job timer. For example, if the short-interval job timer is currently set to fire every 20 seconds, then at every firing the next execution time for each entry is decremented by 20 seconds.

At operation 1006, it is determined whether any jobs have execution times less than or equal to 0. In some embodiments, the determination may be whether any jobs have execution times less than or equal to some predetermined non-zero threshold.

If the determination at operation 1006 for any jobs is positive (i.e., next execution time is less than or equal to 0 or a threshold), than at operation 1008, each such job is handled by the short-interval scheduler. As noted above, handling a job may include causing the job to be run. In some example embodiments, each job that is to be executed, a helper may be launched to run the job.

After operation 1008, for each of the jobs that have their next execution times is less than or equal to 0 or a threshold, the next execution time is updated based upon its repetition interval. For example, if a job is listed as having a repetition interval of 5000 millisecond, then after its current launch, its next execution time is set to 5000 (or, if the current next execution time has decremented below 0, then the new next execution time may be set compensating for the amount decremented below 0).

After operation 1010, an iteration of processing has been completed, and process 1000 may wait for the next timer firing.

FIG. 11 illustrates a portion of an example XML configuration file 1100 for a scheduled agent, such as, scheduled agent 208, according to some embodiment. For example, upon startup, scheduled agent 208 may read the XML configuration file 1100 to determine the jobs to be scheduled and their scheduling parameters.

The configuration file 1100 may include, for each job to be scheduled, a job description portion 1102 and a trigger information portion 1104. The job description portion 1102 may identify the job name, job group, a job type which may be used to identify the scheduler and/or the interface to the scheduler (e.g., adapter for the Quartz.Net scheduler), and job data including a job type identifier and whether or not this is a batch job.

The trigger portion 1104 specified how the job, identified in the corresponding job description part 1102, is to be triggered.

Figure 12:
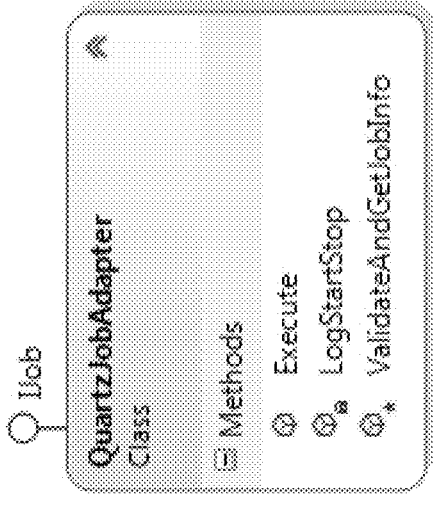
FIG. 12 illustrates an example adapter class that may be used by a scheduled agent to use and/or adapt to a third party scheduler, according to some embodiments.

FIG. 12 illustrates an example adapter class 1200 that may be used by a scheduled agent to use and/or adapt to a third party scheduler, such as, the Quartz.Net adapter. Providing an adapter enhances the configurability of the system. For example, by providing an adapter, a new and/or additional scheduler can be used by merely modifying the adapter, rather than changing the jobs etc.

With many scheduling modules (e.g. Quartz.Net) a more efficient and consistent performance in scheduling may be achieved by, as in these embodiments, providing the scheduling component with a more uniform job mix. This is made possible in some embodiments because, even though the web application may have jobs of a variety of job types active, the other schedulers (e.g., on-demand and short-interval schedulers) which are concurrently running provide scheduling for jobs with characteristics that are significantly different from those scheduled by the scheduler. Embodiments also provide an advantage that the scheduling for job does not require to be handled by a developer, and can be commonly handled by the framework in the embodiments while requiring the developer to merely provide the job type.

Moreover, because a separate scheduler is provided for each type or group of types, embodiments can configurably change (pre-configuration or dynamic configuration) the number of threads allocated on each processing unit, and thereby control the level of service provided to each type of job.

The on-demand agent which, in embodiments, is used to run user-initiated jobs, typically when the user is using the web application online (e.g., create a report based on the criteria that the user selected) typically needs higher thread allocation so that users so that the time for user to obtain results is reasonably short or optimal. The on-demand agent can also be used to distribute the processing load from a scheduled job. For example, assume that there is a job scheduled to run at 4:00 PM everyday which processes records in a feed file that is to arrive daily at around the same time. If the number of records to be processed is large and unknown, having a single job processing the all the records is very inefficient. Therefore, based on the number of records to process, a certain number of jobs that process these records are added to the on-demand job queue. Since, in some example embodiments, the on-demand queue is distributed, these jobs will be picked up by any server that is free to process jobs. Thus a fair distribution of load can be achieved.

The short interval agent enables running of jobs that need to be run very frequently without the overheads of a scheduler or queue. These typically include jobs that listens to a queue and are processed on a first come first serve basis. These jobs are typically always running with very short idle times.

Another advantageous feature of the scheduled job agent in some embodiments is batching. A flag "IsBatch" in an XML configuration file for short interval jobs can be used to control how each job is executed. The default value of this flag may be set to false in which case, the QuartzJobAdapter queues a job with the configured job type id key parameter into the on-demand queue (instead of executing the job). If the IsBatch flag value is true, it indicates a batch job and there is some batching of individual jobs involved. In this case the job with the job type id key parameter is run immediately. This job is typically a batcher job which adds a number of jobs into the on-demand queue based on the number of items to be processed.

The embodiments are particularly advantageous in web applications. Most web applications require some kind of background processing to offload CPU-intensive tasks from web server. Alerting, reporting, sending emails, logging, etc. are some common features of any modern web application. This framework handles all kinds of job processing required for a web application. The on-demand agent specifically is designed to cater to dynamic job requests from an online user to give the best user experience possible without long wait times.

FIG. 13 shows an example machine to job type mapping table 1200 that may be used in some embodiments. The mapping 1300 may be used by agents, during the scheduling, to cause execution of jobs only on certain authorized machines based upon the particular job types. Cleanup of jobs that are not authorized for a particular machine may be undertaken by a scheduled process, such as that described above in relation to the scheduled job agent.

Figure 14:
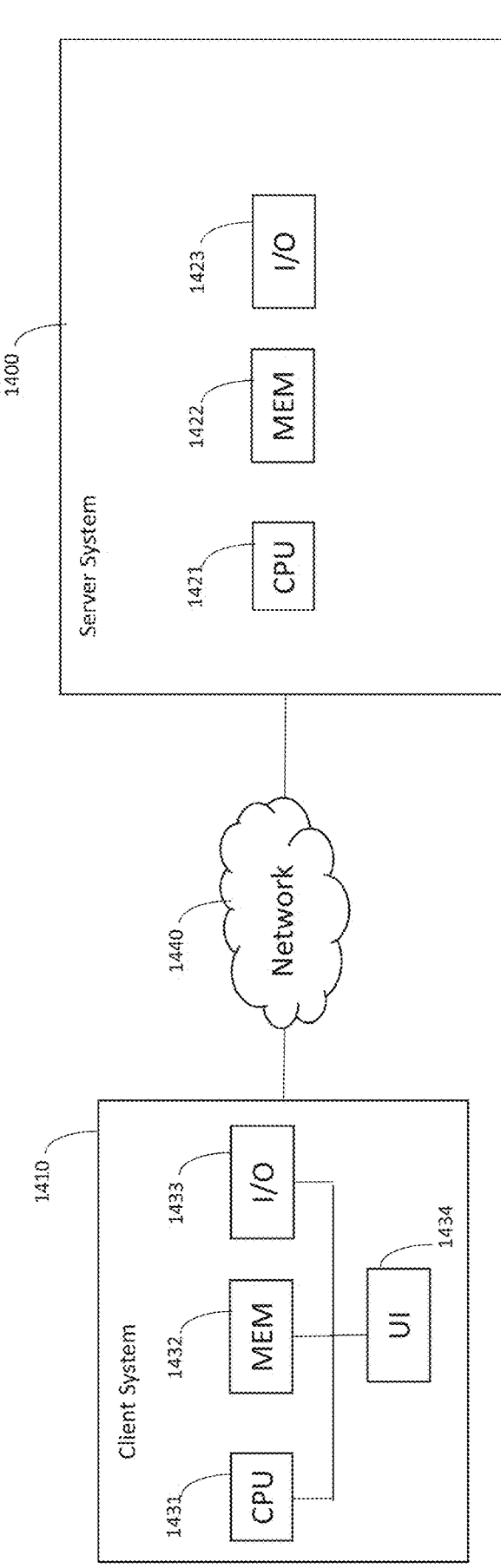
FIG. 14 shows an example block diagram of a hardware architecture for the systems shown in FIG. 1, according to some embodiments.

FIG. 14 shows an example block diagram of a hardware architecture for the system 100 according to some embodiments. The client system 1410 communicates with a server system 1400 via a network 1440. The network 1440 could comprise a network of interconnected computing devices, such as the internet. The network 1440 could also comprise a local area network (LAN) or could comprise a peer-to-peer connection between the client system 102 and the server system 1000.

The example client system 1410 and server system 1400 could correspond to client system 102 and server system 104 as shown in FIG. 1. That is, the hardware elements described in FIG. 14 could be used to implement the various software components and actions shown and described herein with reference to FIG. 1 etc. For example, the client system 1410 could include at least one processor CPU 1431, at least one memory 1432, at least one input/output device I/O 1433, and a component for generating and displaying a user interface UI 1434. The I/O device 1433 can be all encompassing and could include a communication device, such as a transceiver for sending and receiving data (e.g., a wireless transceiver, a wired transceiver). I/O device 1433 could also include an interface for connecting a non-transitory computer readable storage medium to the client system 1410 to send and receive data.

It should be appreciated that the combination of elements in client system 1410 could be used to implement the example web browser application 114 shown in FIG. 2. For example, the memory 1432 could load the files associated with the application (e.g., HTML, XML, JavaScript files) and the CPU 1431 could be used to operate the rendering module, networking module, and JavaScript module discussed above to generate the application. Likewise, the I/O device 1433 could be utilized by the networking module to fetch the various elements comprising the SPA from the server system 1400.

Server system 1400 also comprises various hardware components used to implement the software elements for server system 104 as shown in FIG. 2. For example, server system 1400 could also include hardware components of at least one processor CPU 1421, at least one memory 1422, and at least one input/output device I/O 1423. The I/O device 1423 can be all encompassing and could include a communication device, such as a transceiver for sending and receiving data (e.g., a wireless transceiver, a wired transceiver). I/O device 1423 could also include an interface for connecting a non-transitory computer readable storage medium to the server system 1400 to send and receive data. In one example embodiment, I/O device 1433 of the client system can perform communication via the network with I/O 1423 of the server system.

Similar to client system 1410, the server system 1400 could implement the components for generating the application. For example, the memory 1422 could be used to store the information in database 120 as well as the components and files utilized by web server 116 and application server 118. The CPU 1421 could be used in executing the software necessary to generate the respective modules that are requested by and transmitted to the client system 1410. For example, CPU 1421 could be used to generate the necessary modules created by application server 118. Likewise, I/O device 1423 can be used by the web server 116 to transmit the different application elements to the client system 1410. Of course, these examples are non-limiting and the system envisions utilizing the hardware elements in a variety of aspects.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art. As used in this document, the term "non-transitory computer readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "processing system" as used in this document means at least one of a CPU, GPU, ASIC, FPGA or other hardware circuit for executing instructions, such as, for example, the software programs comprising the above described web application.

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

While the technology has been described in relation to AngularJS, this is done for ease of description; it is to be understood that the technology described in this document is applicable in the context of other SPA technologies, other web technologies, and/or any other software technology.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A computer system, comprising:
at least one memory; and
a processing system having at least one processor, the processing system being configured to perform operations comprising:
   starting a plurality of job schedulers in response to one or more first commands from a single process during startup of an application;
   configuring, in the memory, a job database having a plurality of job entries, wherein each job entry from the plurality of job entries has a job type;
   concurrently executing the plurality of job schedulers independently of each other, wherein:
      each job scheduler is configured to schedule execution of jobs in the job database that are of a particular type different from other types of jobs others of the plurality of job schedulers are configured to schedule;
      at least two of the job schedulers of the plurality of job schedulers each is associated with a respective job queue and is configured to start a respective job runner process to execute jobs in the associated respective job queue;
      a first one of the started job runner processes is a synchronized runner process which is configured to return after completion of execution of a first corresponding job run by the first one of the started job runner processes; and
      a second one of the started job runner processes is an asynchronous runner process which is configured to return before a second corresponding job run by the second one of the started job runner processes completes execution; and
   stopping one or more of the plurality of job schedulers in response to a second command to shutdown the application from the single process.

2. The computer system according to claim 1, wherein the operations further include updating a particular database by each of the plurality of job schedulers at regular intervals, and monitoring the particular database.

3. The computer system according to claim 2, wherein the monitoring includes, in response to detecting an absence of updating for a predetermined period of time by one of the plurality of job schedulers, causing the single process to start another instance of said one of the plurality of job schedulers.

4. The computer system according to claim 1, further comprising a timer configured to fire at preconfigured regular time intervals, wherein a first job scheduler of the plurality of job schedulers causes execution of a job from its non-empty job queue upon respective firings of the timer, and wherein a second job scheduler of the plurality of job schedulers causes execution of jobs in its non-empty job queue at predetermined times in accordance with notifications from another component other than the timer.

5. The computer system according to claim 1, wherein at least one of the job schedulers of the plurality of job schedulers include a high priority job manager and a low priority job manager each having a different concurrency level, and wherein each of the high priority job manager and the low priority job manager is configured to simultaneously execute a number of jobs not exceeding a respective configured concurrency level.

6. The computer system according to claim 5, wherein the memory comprises a respective job queue for each said high priority job manager and said low priority job manager, and wherein jobs from the database are assigned to respective ones of said job queues in accordance with an amount of free capacity of the respective job queue and a concurrency levels of the corresponding job manager.

7. The computer system according to claim 1, wherein a first job scheduler updates a temporary list upon execution of each job regarding status of the executed job, and at regular intervals, using the updated temporary list, updates said database regarding statuses of a plurality of jobs.

8. The computer system according to claim 1, wherein the plurality of job schedulers include a scheduled-job scheduler operating to schedule jobs of a first type at predetermined specific times or at intervals greater than the predetermined duration, and at least one of the on-demand scheduler operating to schedule jobs of a second type according to an on-demand basis, and the short-interval scheduler operating to schedule jobs of a third type occurring repetitively at intervals of less than a predetermined duration.

9. The computer system according to claim 1, wherein the plurality of schedulers include the on-demand scheduler operating to schedule jobs of a first type according to an on-demand basis, the short-interval scheduler operating to schedule jobs of a second type occurring repetitively at intervals of less than a predetermined duration, and the scheduled-job scheduler operating to schedule jobs of a third type at predetermined specific times or at intervals greater than the predetermined duration.

10. The computer system according to claim 1, wherein the plurality of job schedulers schedule jobs of the application, and wherein the single process is started during system startup or startup of the web application.

11. The computer system according to claim 1, wherein the plurality of job schedulers schedule jobs of the application, and wherein the second command is generated by the single process in response to shutdown of the application.

12. A method performed by at least one processor of a processing system, comprising:

starting, by the at least one processor, a plurality of job schedulers in response to one or more first commands from a single process during startup of an application;

configuring, in a memory and by the at least one processor, a job database having a plurality of job entries, wherein each job entry from the plurality of job entries has a job type;

concurrently executing by the at least one processor, the plurality of job schedulers independently of each other, wherein each job scheduler is configured to schedule execution of jobs in the job database that are of a particular type different from other types of jobs others of the plurality of job schedulers are configured to schedule;

at least two of the job schedulers of the plurality of job schedulers each is associated with a respective job queue and is configured to start a respective job runner process to execute jobs in the associated respective job queue;

a first one of the started job runner processes is a synchronized runner process which is configured to return after completion of execution of a first corresponding job run by the first one of the started job runner processes; and a second one of the started job runner processes is an asynchronous runner process which is configured to return before a second corresponding job run by the second one of the started job runner processes completes execution; and stopping, by the at least one processor, one or more of the plurality of job schedulers in response to a second command to shutdown the application from the single process.

13. The method according to claim 12, further comprising configuring a timer to fire at preconfigured regular time intervals, wherein a first job scheduler of the plurality of job schedulers causes execution of a job from its non-empty job queue upon respective firings of the timer, and wherein a second job scheduler of the plurality of job schedulers causes execution of jobs in its non-empty job queue at predetermined times in accordance with notifications from another component other than the timer.

14. The method according to claim 12, wherein at least one of the job schedulers of the plurality of job schedulers include a high priority job manager and a low priority job manager each having a different concurrency level, and wherein each of the high priority job manager and the low priority job manager is configured to simultaneously execute a number of jobs not exceeding a respective configured concurrency level.

15. The method according to claim 12, wherein a first job scheduler updates a temporary list upon execution of each job regarding status of the executed job, and at regular intervals, using the updated temporary list, updates said database regarding statuses of a plurality of jobs.

16. The method according to claim 12, wherein the plurality of schedulers include the on-demand scheduler operating to schedule jobs of a first type according to an on-demand basis, the short-interval scheduler operating to schedule jobs of a second type occurring repetitively at intervals of less than a predetermined duration, and the scheduled-job scheduler operating to schedule jobs of a third type at predetermined specific times or at intervals greater than the predetermined duration.

17. A non-transitory computer readable storage medium having stored instructions that, upon being executed by at least one processor of a processing system, causes the processing system to perform operations including:

starting, by the at least one processor, a plurality of job schedulers in response to one or more first commands from a single process during startup of a application;

configuring, in a memory and by the at least one processor, a job database having a plurality of job entries, wherein each job entry from the plurality of job entries has a job type;

concurrently executing, by the at least one processor, the plurality of job schedulers independently of each other, wherein each job scheduler is configured to schedule execution of jobs in the job database that are of a particular type different from other types of jobs others of the plurality of job schedulers are configured to schedule;

at least two of the job schedulers of the plurality of job schedulers each is associated with a respective job queue and is configured to start a respective job runner process to execute jobs in the associated respective job queue;

a first one of the started job runner processes is a synchronized runner process which is configured to return after completion of execution of a first corresponding job run by the first one of the started job runner processes; and a second one of the started job runner processes is an asynchronous runner process which is configured to return before a second corresponding job run by the second one of the started job runner processes completes execution; and stopping, by the at least one processor, one or more of the plurality of job schedulers in response to a second command to shutdown the application from the single process.

18. The non-transitory computer readable storage medium according to claim 17, the operations further comprising configuring a timer to fire at preconfigured regular time intervals, wherein a first job scheduler of the plurality of job schedulers causes execution of a job from its non-empty job queue upon respective firings of the timer, and wherein a second job scheduler of the plurality of job schedulers causes execution of jobs in its non-empty job queue at predetermined times in accordance with notifications from another component other than the timer.

19. The non-transitory computer readable storage medium according to claim 17, wherein at least one of the job schedulers of the plurality of job schedulers include a high priority job manager and a low priority job manager each having a different concurrency level, and wherein each of the high priority job manager and the low priority job manager is configured to simultaneously execute a number of jobs not exceeding a respective configured concurrency level.

\* \* \* \* \*